Oct. 19, 1948.  J. F. PERKINS  2,451,771
PREROTATION MEANS FOR AIRPLANE LANDING WHEELS
Filed March 4, 1946

INVENTOR,
JAMES F. PERKINS.
BY
Stephen S. Townsend
ATTORNEY.

Patented Oct. 19, 1948

2,451,771

UNITED STATES PATENT OFFICE 2,451,771

PREROTATION MEANS FOR AIRPLANE LANDING WHEELS

James F. Perkins, Oakland, Calif.

Application March 4, 1946, Serial No. 651,700

2 Claims. (Cl. 244—103)

This invention relates to means for imparting prerotation to the landing wheels of aircraft, so that they will be rotating in the proper direction when they contact the ground in landing.

Heavy airplanes of modern type land at high speeds of sixty-five to one hundred forty miles per hour, or even higher. Without a prerotation device, the wheels will not be revolving when they first hit the ground and will not revolve fast enough to match the speed of the airplane for a substantial period of time thereafter. Until they do attain such speed, the tires will be dragged, scuffed and burned, which results in substantial damage to the tires, the damage increasing with the weight they have to carry and the speed of landing.

An object of this invention is to provide a prerotation means which is simple in construction and effective in operation. Another object of this invention is to provide a prerotation means which can be easily built into a new airplane while it is being constructed or which can be easily attached to a completed airplane, regardless of whether or not the airplane was designed with a view to accommodating a prerotation means. Still another object of this invention is to provide a prerotation means which does not require that material of which it is made be bent or flexed in operation; and further objects and advantages of this invention will become apparent on reading this specification.

Figure 1:
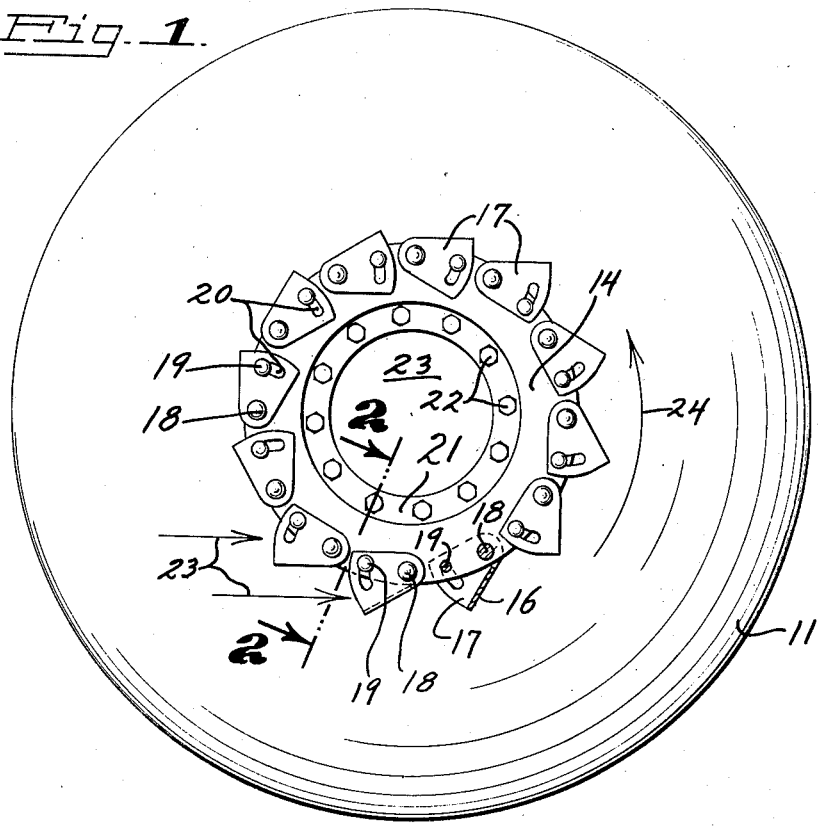
Fig. 1 is a side elevation, partly in section, of an airplane wheel equipped with my novel prerotation device.
Figure 2:
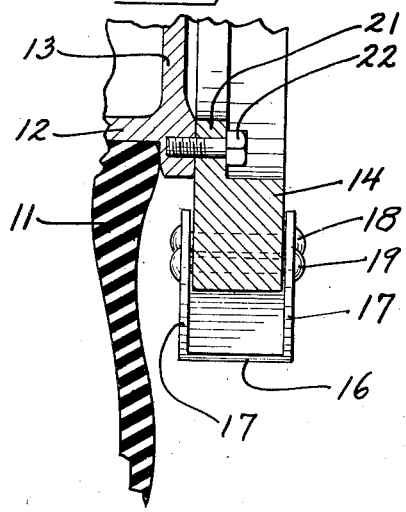
Fig. 2 is a section on the line 2—2 of Fig. 1.

My invention comprises a series of pivotally mounted vane-like or cup-like members mounted on a frame, which can be easily attached to a wheel with the members arranged about the axis of rotation so that the wind effect, due to the speed of the airplane, will cause the frame and, consequently, the wheel to be rotating in the proper direction when it strikes the ground.

Referring to the structure illustrated in the drawings for a more detailed description of the preferred embodiment of the invention, a conventional or other type of tire 11 which is formed as a part of or may be mounted on a conventional or other type of rim 12, which forms a part of the metal wheel 13. The frame of my novel invention is preferably an annular member 14. A series of vanes 16 are pivotally mounted around the annular frame opposite the peripheral face thereof. Side members 17 extend from the vanes 16 to the frame on each side thereof to straddle it, and pivot pins 18 pass through the frame and side members so that the latter have free pivotal movement thereon. Pins 19, attached to the frame and extending through elongated slots 20 in the side members 17, limit this pivotal movement. The vanes 16 and side members 17, together with the periphery of the frame, constitute a series of cups or buckets which can pivot to open or operative position or to closed or inoperative position.

The frame 14 is provided with a flange 21. Fastening means, such as bolts 22, extending through such flange, fasten the frame to the wheel 13, preferably adjacent to the rim thereof. This provides an open space 23 which affords easy access to the wheel hub and bearing.

With the airplane moving at high speed in the direction from right to left, as seen in Fig. 1, and with the wheel not revolving, the forces of gravity and of the wind, the latter being indicated by the arrows 23, will cause the lower buckets to be open and the upper buckets to be closed, which will cause the wheel to rotate in the direction indicated by arrow 24. As the speed of rotation of the wheel increases, centrifugal force arises which tends to cause all of the buckets to assume open positions. This tendency is insufficient to overcome the forces of gravity and of wind pressure up to a certain critical high speed of rotation, so that operation will be as illustrated in Fig. 1; but even if such critical high speed of rotation be reached or exceeded, the wind pressure against the larger open ends of the lower buckets will be more effective than against the closed smaller ends of the upper buckets, with the result that the wind pressure will still cause rotation of the wheel in the right direction. Care should, of course, be taken that the wind-receiving ends of the vanes or buckets are directed forwardly in the direction of movement of the airplane when they are at their lower positions of rotation and directed forwardly, that is, below the axis.

The invention is easily applicable to any airplane landing wheel merely by providing such wheel with threaded holes to receive the fastening bolts if they are used. Welding the frame to the wheel or making them integral with each other avoids the necessity thereof.

While I have referred to and illustrated certain details for the purpose of explaining my invention, it is to be understood that they may be varied within the spirit of the invention, the

I claim:

1. A prerotation device for attachment to an airplane wheel comprising an annular auxiliary frame the outer peripheral portion of said frame spaced laterally from a side wall of a tire mounted on said wheel, a series of pairs of side members at each side of the frame and pivoted thereto, the side members having slots therein, pins on the frame and projecting through the slots, and vanes opposite the outer periphery of the frame and connecting the pairs of side members, each said pair of side members and a connected vane forming a pivotally mounted bucket-like member to entrap air during a part of the rotative travel of the wheel to which the device is attached.

2. A prerotation device for attachment to an airplane wheel comprising an annular auxiliary frame the outer peripheral portion of said frame spaced laterally from a side wall of a tire mounted on said wheel, a flange on the frame projecting inwardly to overlap the area of the wheel for attachment thereto, a series of pairs of side members at each side of the frame, pins on the frame and projecting transversely thereof to attach pivotally the side members to the frame, the side members having slots therein, pins on the frame and projecting transversely thereof through the slots to limit pivotal movement of the side members, and vanes opposite the outer periphery of the frame and connecting the pairs of side members, each said pair of side members and a connected vane forming a pivotally mounted bucket-like member to entrap air during a part of the rotative travel of the wheel to which the device is attached.

JAMES F. PERKINS.

REFERENCES CITED

The following references are of record in the file of this patent:

UNITED STATES PATENTS

| Number | Name | Date |
| --- | --- | --- |
| 75,648 | Reynolds | Mar. 17, 1868 |
| 2,287,491 | Wolverton | June 23, 1942 |
| 2,333,191 | Mitton | Nov. 2, 1943 |
| 2,382,321 | Johnson | Aug. 14, 1945 |
| 2,412,406 | Kerezi | Dec. 10, 1946 |